(12) United States Patent
Horne et al.

(10) Patent No.: US 6,687,635 B2
(45) Date of Patent: Feb. 3, 2004

(54) APPARATUS AND METHOD FOR COMPENSATED SENSOR OUTPUT

(75) Inventors: Stephen F. Horne, Chelmsford, MA (US); Philip J. Maiorana, Cambridge, MA (US); Santhi E. Mathew, Londonderry, NH (US); Leonid Mindlin, South Natick, MA (US); Claudia J. Quigley, Lexington, MA (US); Eric R. Taranto, Yucapia, CA (US); Donald K. Smith, Belmont, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 10/170,861

(22) Filed: Jun. 13, 2002

(65) Prior Publication Data

US 2003/0233205 A1 Dec. 18, 2003

(51) Int. Cl.[7] .......................... G06F 13/14; G06F 17/00
(52) U.S. Cl. .......................... 702/86; 702/104; 73/708; 73/763
(58) Field of Search .............................. 702/86, 99, 104, 702/107; 73/708, 763, 765, 768; 709/219, 220, 228; 340/3.7; 700/9

(56) References Cited

U.S. PATENT DOCUMENTS

| 5,479,096 | A | | 12/1995 | Szczyrbak et al. | 324/132 |
|---|---|---|---|---|---|
| 5,568,096 | A | * | 10/1996 | Haartsen | 331/1 R |
| 5,805,442 | A | | 9/1998 | Crater et al. | 340/3.7 |
| 5,848,383 | A | | 12/1998 | Yunus | 702/104 |
| 5,942,692 | A | * | 8/1999 | Haase et al. | 73/724 |
| 6,588,280 | B1 | * | 7/2003 | Quigley et al. | 73/708 |
| 6,612,176 | B2 | * | 9/2003 | Poulin et al. | 73/708 |

* cited by examiner

Primary Examiner—Kamini Shah
(74) Attorney, Agent, or Firm—McDermott, Will & Emery

(57) ABSTRACT

A compensated sensor includes a sensor, a relatively fast feedthrough path, and a relatively slow compensation path. The relatively fast feedthrough path includes a summer and output circuitry, such as a summing amplifier. The relatively slow compensation path includes circuitry that produces one or more correction factors for such sensor deficiencies as temperature dependency, or nonlinearity effects, for example. These one or more correction factors are fed to the summer for summing with the uncompensated sensor output. Additionally, the output of the output circuitry (e.g., summing amplifier), is fed back to the compensation circuitry where it is compared to a compensated sensor output developed by the compensation circuitry. The difference between the compensated sensor signal developed in the compensation circuitry and the output signal fed back to the compensation circuitry is also provided to the summer for summing with the one or more correction factors and the uncompensated sensor output.

29 Claims, 4 Drawing Sheets

APPARATUS AND METHOD FOR COMPENSATED SENSOR OUTPUT

FIELD OF DISCLOSURE

The present disclosure relates to the field of physical sensing and, more particularly, to the correction of sensor errors due to such factors as nonlinear sensor response and temperature effects, for example.

BACKGROUND OF DISCLOSURE

Control systems operate with electrical signals that represent pressure, force, flow rate, or other sensed physical parameter. The physical parameter must be converted to a current or voltage signal before further processing or analysis by the control system. For example, capacitive and resistive sensors are often used for measuring pressure, and resistive "bridges" are used to measure mass flow. Unfortunately, such sensors typically exhibit nonlinear behavior and temperature dependencies. For example, a pressure sensor may provide a given voltage swing for a given pressure change at a specified temperature and pressure range, but a different voltage swing for the same pressure change over a different pressure range. Or the sensor may provide a different voltage swing for the same pressure change at the same pressure range, but at a different temperature.

Although sensor compensation techniques for such sensor inadequacies as temperature and/or nonlinearity effects are known, they tend to be time consuming and/or costly. A method and apparatus for the compensation of such deficiencies that provides a rapid response, precise compensation, at a relatively low cost would be highly desirable.

SUMMARY OF DISCLOSURE

A compensated sensor in accordance with the principles of the present invention includes a sensor, a relatively fast feedthrough path, and a relatively slow compensation path. The relatively fast feedthrough path includes a summer and output circuitry, such as a summing amplifier. The relatively slow compensation path includes circuitry that produces one or more correction factors for such sensor deficiencies as temperature dependency, or nonlinearity effects, for example. These one or more correction factors are fed to the summer for summing with the uncompensated sensor output. Additionally, the output of the output circuitry (e.g., summing amplifier), is fed back to the compensation circuitry where it is compared to a compensated sensor output developed by the compensation circuitry. The difference between the compensated sensor signal developed in the compensation circuitry and the output signal fed back to the compensation circuitry is also provided to the summer for summing with the one or more correction factors and the uncompensated sensor output.

In an illustrative embodiment, a compensated sensor in accordance with the principles of the present invention includes a sensor, digital compensation circuitry, and analog circuitry that produces an analog sensor output. An uncompensated sensor output signal is routed to an analog output circuit that sums, in real time, the uncompensated sensor signal with a correction signal developed in the digital compensation circuitry. Using this approach, the analog output signal may respond quickly to changes in the physical parameter being measured by the sensor to produce an updated analog output signal. The digital compensation circuitry may respond more slowly than the analog circuitry to changes in the sensor output, and it operates to "fine tune" the analog output signal by adding one or more correction factors, each of which may compensate for one or more sensor deficiencies. The compensated deficiencies may include nonlinear response or temperature dependencies, for example. Additionally, the digital circuitry may compare the compensated sensor output to the analog output and thereby develop an error signal that is summed with the uncompensated signal and the correction signal in real time, by the analog output circuitry, for example. That is, the digital compensation circuitry may be arranged to compensate the raw sensor output and, in a feedback loop, to compare the digitally compensated sensor output to the analog sensor output. The difference between the digitally compensated sensor output and the analog sensor output may then be summed with the digitally compensated sensor output to form the analog sensor output.

In an illustrative embodiment, a compensated sensor includes a sensor, digital compensation circuitry, and analog output circuitry. The digital compensation circuitry functions include: nonlinearity compensation, temperature compensation, zero offsets, and output amplifier compensation. The analog output circuitry responds very quickly to changes in the sensor output so that, for example, the sensor module may be employed in control system applications. The digital compensation circuitry may be less responsive, that is, slower, than the analog output circuitry, but it provides greater precision. The compensated sensor may be particularly useful in a system that requires relatively high-speed response to input signal fluctuations but can accommodate somewhat less rapid output signal compensation. In particular, the compensated sensor may include a pressure or mass flow sensor and may provide feedback to a controller that controls the supply of fluid to a chamber.

A compensated sensor in accordance with the principles of the present invention is particularly well suited to systems that monitor the pressure of a fluid flowing into or out of a chamber. The compensated sensor may be used to monitor the pressure on the inlet or outlet side of the chamber, or may monitor the pressure within the chamber. The compensated sensor's output may be used to control the flow of fluid into and/or out of the chamber. Similarly, a compensated sensor in accordance with the principles of the present invention may be employed to monitor the flow of a fluid into or out of a chamber and to control such flow.

In an illustrative embodiment, an analog sensor output, S, is fed to a summing amplifier input and to an analog-to-digital converter (ADC). Digital circuitry compensates the output of the ADC for temperature, and/or nonlinearity sensor artifacts that may degrade the sensor's performance. The digital circuitry may also compensate for other sensor errors. In this illustrative embodiment, the compensation is achieved by adding a correction factor, C1, to the uncompensated signal, S. The analog output, A, (the output of the summing amplifier), is also converted to a digital signal by an ADC. Depending upon design parameters, this may be the same ADC as the one that converts the sensor output to digital form (with the sensor and summing amplifier outputs multiplexed to the input of the ADC) or it may be a second ADC. As is known in the art, each conversion of signals from analog to digital form, and from digital to analog form, may include scaling and offsets to properly represent and compare the converted signals.

The digital circuitry, which may include a microprocessor, performs a comparison to determine the difference between the analog output signal (converted to digital form) and the compensated sensor signal (S+C1). The difference between these signals forms a second compensation factor, CA1. The two compensation factors are used as an error signal. After conversion to analog form C1 and CA1 (separately, or in combination), the error signal is fed to the summing amplifier for combination with the uncompensated sensor output, yielding an input to the summing amplifier of the form S+C1+CA1, where S is the uncompensated sensor output, C1 is one or more compensation factors that compensate for temperature, nonlinearity and/or other sensor deficiencies, and CA1 is a correction factor that compensates for output circuitry error. In this illustrative embodiment, the compensated sensor module also includes a compensated digital output signal. If included, the microprocessor may take on any of several forms known in the art, such as a general purpose microprocessor, a microcontroller, a reduced instruction set controller (RISC), a digital signal processor (DSP), or a core microprocessor of an application specific integrated circuit, for example.

BRIEF DESCRIPTION OF DRAWINGS

The foregoing and other features and advantages of this disclosure will be better understood from the detailed description and the drawings, in which.

DETAILED DESCRIPTION

Figure 1:
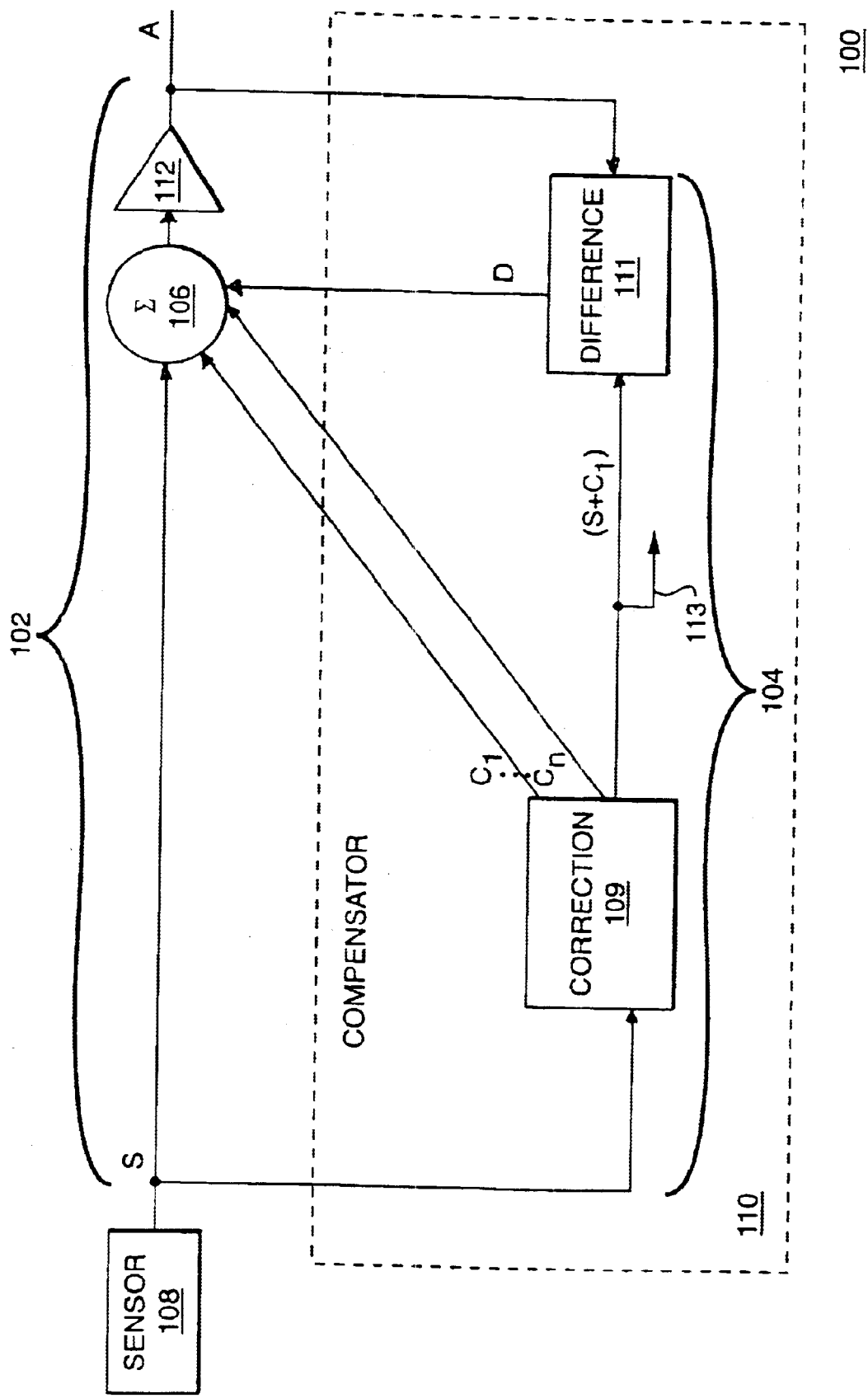
FIG. 1 is a conceptual block diagram of a compensated sensor in accordance with the principles of the present invention.

The block diagram of FIG. 1 provides an overview of a compensated sensor 100 in accordance with the principles of the present invention. The compensated sensor 100 includes a relatively fast feedthrough path 102 and a somewhat slower but more precise compensation path 104. The feedthrough 102 and compensation 104 paths are united by a summer 106. A sensor 108 provides a signal that is responsive to a physical phenomenon, such as pressure or mass flow, for example. The uncompensated sensor signal, S, output from the sensor 108 is fed along the feedthrough path 102 to the summer 106, which responds nearly instantaneously by producing an output SA.

The uncompensated sensor signal, S, is also fed along the compensation path 104 to a compensator 110. In a correction block 109, the compensator 110 produces one or more compensation values, C1–Cn, which may be combined within the compensator 110, then provided to the summer 106, or provided to the summer 106 separately. The compensation values C1–Cn may compensate for sensor nonlinearity, temperature effects, or other sensor deficiencies. The compensator 110 either includes or has access to information necessary for compensating the sensor errors. That is, for example, the compensator 110 includes an input that provides access to, or includes circuitry that determines, the current temperature of a sensor that is being compensated for temperature effects.

The feedthrough path 102 includes an output amplifier 112. As is known in the art, the summer 106 may be incorporated with the output amplifier 112 to form a summing amplifier. The output amplifier 112 produces a compensated sensor output: analog signal, A. That is, as the sum of one or more correction factors produced by the compensator 110, and the uncompensated sensor signal S, the analog output A of the amplifier 112 is the compensated sensor output. In addition to being available for use by external circuitry, the output A, properly scaled if necessary, is fed back to the compensator 110, where it is compared in a difference circuit 111 to a compensated signal of the form (S+C1), where S is the uncompensated sensor output and C1 is one or more correction factors that compensate for temperature, nonlinearity, or other sensor defects. The difference, D, between the output signal A and the compensated signal (S+C1) is fed to the summer 106. After a settling period, during quiescent operation, the output signal A and the compensated signal S+C1 are equal. During a transient, however, the slower compensator 110 will not update as quickly as the feedthrough path 102. Consequently, during a transient period, the output A will be the sum of an updated, uncompensated sensor signal St1 and an older correction factor Ct0 (which may include a plurality of correction factors C1–Cn and a difference signal D). After a delay, the compensator produces a correction factor Ct1 that corresponds to the updated sensor output St1; this updated correction factor is then added to the sensor output St1 in the summer 106. The compensated signal, S+C1, may also be made available as an output 113 to other circuitry.

Figure 2:
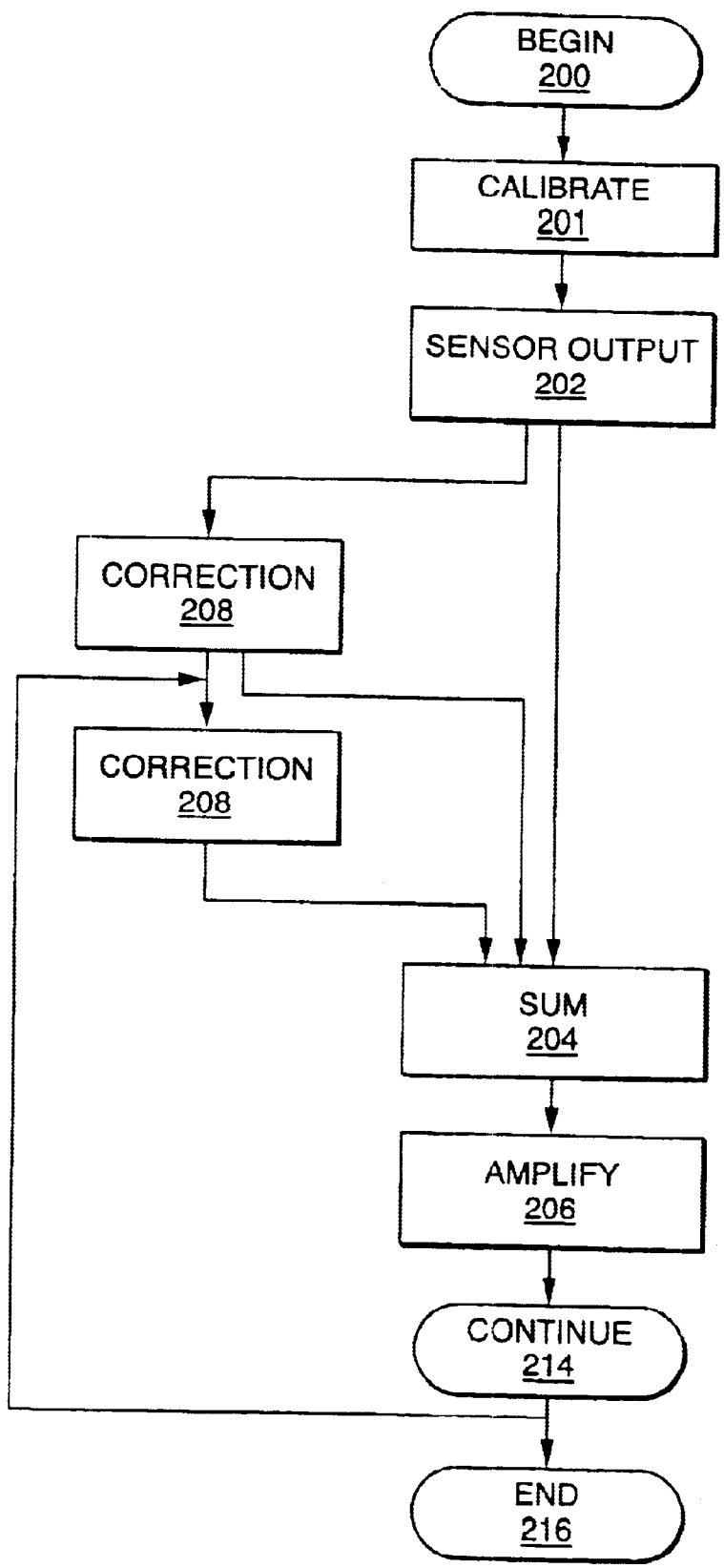
FIG. 2 is a flow chart that describes a sensor compensation process in accordance with the principles of the present invention.

The flow chart of FIG. 2 illustrates a sensor compensation process in accordance with the principles of the present invention. The process begins in step 200 and proceeds to step 201, where the sensor is calibrated. During this calibration process, calibration constants related to the "zero", "span", and nonlinearity of the sensor may be stored. This storage may be arranged as a lookup table, for example. From step 201, the process proceeds to step 202 where a sensor produces an output that is representative of a physical phenomenon that it is monitoring, such as temperature, pressure, or mass flow, for example. The sensor may be susceptible to one or more aberrations in its output signal. That is, the sensor may exhibit unwanted temperature dependencies, or may provide a non-linear response to the physical phenomenon that it is monitoring. From step 202 the process proceeds (e.g., along the feedthrough path 102 of FIG. 1) to step 204 where one or more correction factors are summed with the uncompensated sensor output. As previously noted, these correction factors may compensate for known and characterized deficiencies in the sensor's response, such as the temperature dependency of a pressure sensor, for example.

From step 204 the process proceeds to step 206, where the compensated sensor signal, the sum of the correction factor and uncompensated sensor signal, may optionally be amplified. The amplifier may provide a low impedance output for driving a control signal, for example. Additionally, the summing and amplification process may be carried out in a single, summing amplifier. Concurrent with the operation of steps 204 through 206, the uncompensated sensor signal is fed to a compensator in step 208 (e.g., along the compensation path 104 of FIG. 1), where one or more correction factors are developed to compensate for deficiencies, such as temperature dependency, nonlinearity, or aging effects, for example. The one or more correction factors developed in this step are summed with the uncompensated sensor output in step 204. That is, this parallel leg of the process links up with the other process path (e.g., feedthrough path 102 of FIG. 1) in step 204 where the compensation factors are summed with the uncompensated sensor signal, yielding a compensated sensor output signal. This compensated sensor output signal may be made available at a separate, compensated sensor output. As a part of the compensated path 104, this compensated sensor output is not the same signal as that provided by the output of the summer in step 204. Rather, this compensated output is more accurate, but typically slower to update than the output of the feedthrough path 102. That is, because the development of correction factors that takes place in step 208 may be more time-consuming than the summation of the uncompensated signal with the compensation factors, the summation may be, particularly during transients, between a current uncompensated sensor signal and an "outdated" compensation factor.

From step 208 the process proceeds to step 210, where the compensated sensor output of the feedthrough path 102 is compared to the compensated sensor output of the compensation path 104 and a difference signal is created for use in further processing of the uncompensated sensor output. The process proceeds from step 210 to step 204 where the difference signal is combined with the one or more correction factors developed in step 208 and with the uncompensated sensor output developed in step 202. As indicated by the "continue" block of step 214, the process continues indefinitely in this manner, ending in step 216, for example, when power to the compensated sensor is turned off.

Figure 3:
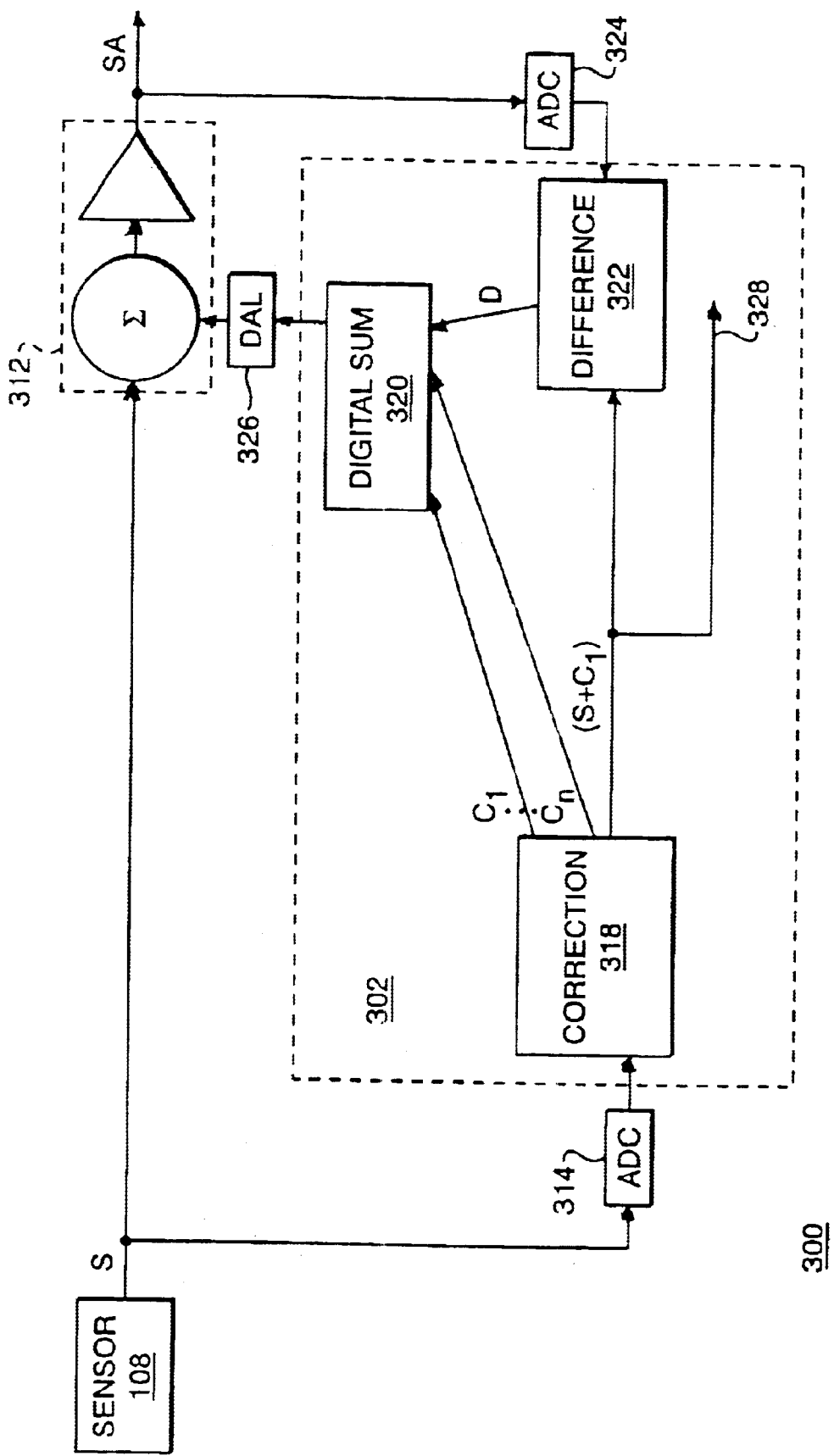
FIG. 3 is a more detailed block diagram of a compensated sensor in accordance with the principles of the present invention.

In the illustrative embodiment depicted by the block diagram of FIG. 3, a compensated sensor 300 in accordance with the principles of the present invention includes a digital compensator 302, which forms the bulk of a compensation path 301. Analog circuitry forms the bulk of a feedthrough path. The analog circuitry and digital compensator 302 produce a compensated analog sensor output A. A sensor 310 that is responsive to a physical phenomenon, such as pressure or mass flow, for example, produces an uncompensated sensor output signal S. The uncompensated sensor signal, S, output from the sensor 310, is fed along the feedthrough path 308 to a summing amplifier 312. The summing amplifier 312 is known in the art and responds nearly instantaneously by producing an output A that is the sum of the uncompensated sensor output S and a compensation signal CA to be described below.

The uncompensated sensor signal, S, is also fed along the compensation path 304 to an analog to digital converter (ADC) 314, which converts the uncompensated analog sensor signal to a digital signal SD. In this illustrative embodiment, the compensator 302, which includes a correction block 318, a digital sum block 320, and a difference or comparison block 322, may be implemented using a microprocessor, for example. If included, the microprocessor may take on any of several forms known in the art, such as a general purpose microprocessor, a microcontroller, a reduced instruction set controller (RISC), a digital signal processor (DSP), or a core microprocessor of an application specific integrated circuit, for example. The correction block 318, effected in this illustrative example by a microprocessor executing code, produces one or more compensation values, C1–Cn.

The compensation values C1–Cn are summed in the digital sum block 320, which is also implemented in this illustrative embodiment by a microprocessor executing code. As previously described, the compensation values C1–Cn may compensate for sensor nonlinearity, temperature effects, aging effects, or other sensor deficiencies. The compensator 302 either includes or has access to information necessary for compensating the sensor errors. That is, for example, the compensator 302 includes an input that provides access to, or includes circuitry that determines, the current temperature of a sensor that is being compensated for temperature effects. In a feedback path, an ADC 324 converts the analog output signal A, properly scaled if necessary, to digital form. This digitized representation of the output signal A is sent to the difference circuit 322 which, like the correction 318 and digital sum 320 circuits, is implemented in this illustrative embodiment by a microprocessor executing code. A digital to analog converter (DAC) 326 converts the output of the digital sum circuit 320 to analog form and supplies the analog signal to the summing amplifier 312 for addition with the uncompensated sensor output S.

The output amplifier 312 produces a compensated sensor output, analog signal A. That is, as the sum of one or more correction factors produced by the compensator 302, and the uncompensated sensor signal S, the analog output A of the amplifier 312 is the compensated sensor output. In addition to being available for use by external circuitry, the output A, properly scaled if necessary, is fed back to the compensator 302. In the compensator 302, it is compared in the difference circuit 322 to a compensated signal of the form (S+C1), where S is the uncompensated sensor output and C1 is the sum of the one or more correction factors that compensate for temperature, nonlinearity, or other sensor defects. The difference, D, between the output signal A and the compensated signal (S+C1) is fed to the digital summing circuit 320. The output of the digital summing circuit 320 is fed to the DAC 326 for conversion to analog form. The resultant analog correction signal CA is fed to the summing amplifier 312 for summing with the uncompensated analog sensor signal S.

After a settling period, during quiescent operation, the digitized value of analog output signal A and the compensated signal S+C1 are equal. During a transient, however, the slower compensator 302 will not update as quickly as the summing amplifier 312. Consequently, during a transient period, the output A will be the sum of an updated, uncompensated sensor signal St1 and an older correction factor CA0 (which may include a plurality of correction factors C1–Cn and a difference signal D). After a delay, the compensator 302 produces a correction factor Ct1 that corresponds to the updated sensor output St1; this updated correction factor is then added to the sensor output St1 in the summing circuit 326. The compensated signal, S+C1, may also be made available as an output 328 to other circuitry. In an illustrative embodiment, this output is made available in the form suitable for a network interface, such as a DeviceNet interface. Although, in this illustrative embodiment, two ADCs 314, 324 are employed to separately convert the uncompensated sensor output S and the amplifier output A, a single ADC with multiplexed input could be used to convert both analog signals to digital form.

In an illustrative embodiment the sensor 310 is a pressure sensor that provides a monotonically increasing or decreasing voltage output that is nearly linear over a pressure range of interest. In this embodiment, "nearly linear" means that at a pressure which yields the greatest nonlinearity error, the correction factor is 50% or less of the uncorrected sensor output voltage. Analog circuitry (not shown) is employed in this embodiment to offset and scale the analog voltages fed to the ADCs 314, 324. The voltage output of the sensor 310 is offset and scaled so that at either extreme of the pressure range of interest, the corresponding sensor output voltage substantially matches one or the other extreme of the ADC 314 input range, with sufficient "head room" left to prevent clipping. Similarly, the voltage output of the amplifier 312 is offset and scaled so that at either extreme of the pressure range of interest, the corresponding sensor output voltage substantially matches one or the other extreme of the ADC 324 input range that yields a digital output equal to the corresponding digital output of the ADC 314. Such offsets and scaling take full advantage of the accuracy of the ADCs 314,324 and ensure that, when the analog output voltage A is equal to the voltage represented by the compensated sensor signal S+C1, the difference signal D, is zero.

Compensation for sensor nonlinearities is known in the art and described in U.S. Pat. No. 5,848,383, issued to Yunus, Dec. 8, 1998, which is hereby incorporated by reference in its entirety. In this illustrative embodiment, pressure sensor nonlinearities may be determined during a calibration process. During the calibration process correction values are stored in a lookup table. Given a pressure reading, correction circuitry (microprocessor and code in this embodiment) looks up the appropriate correction value from the lookup table corresponding to the uncompensated value from the pressure sensor. A correction factor for temperature dependency is produced, in a known manner by multiplying a temperature coefficient by the difference between the sensor's current temperature and a calibration temperature. The compensated pressure output, A, is a function of the uncompensated pressure signal S, nonlinearity error, zero and span temperature compensation, zero shifts and variations in the output amplifier.

In an illustrative embodiment the sensor 310 is a mass flow rate sensor that provides a monotonically increasing or decreasing voltage (or current) output that is nearly linear over a flow rate range of interest. In this embodiment, "nearly linear" means that at a flow rate which yields the greatest nonlinearity error, the correction factor is 50% or less of the uncorrected sensor output voltage. Analog circuitry (not shown) is employed in this embodiment to offset and scale the analog voltages fed to the ADCs 314, 324. The voltage output of the sensor 310 is offset and scaled so that at either extreme of the mass flow rate range of interest, the corresponding sensor output voltage substantially matches one or the other extreme of the ADC 314 input range, with sufficient "head room" left to prevent clipping. Similarly, the voltage output of the amplifier 312 is offset and scaled so that at either extreme of the mass flow rate range of interest, the corresponding sensor output voltage substantially matches one or the other extreme of the ADC 324 input range that yields a digital output equal to the corresponding digital output of the ADC 314. Such offsets and scaling take full advantage of the accuracy of the ADCs 314,324 and ensure that, when the analog output voltage A is equal to the voltage represented by the compensated sensor signal S+C1, the difference signal D, is zero.

In this illustrative embodiment, mass flow rate sensor nonlinearities may be determined during a calibration process. During the calibration process correction values are stored in a lookup table. Given a mass flow rate reading, correction circuitry (microprocessor and code in this embodiment) looks up the appropriate correction value from the lookup table corresponding to the uncompensated value from the mass flow rate sensor. A correction factor for temperature dependency is produced, in a known manner by multiplying a temperature coefficient by the difference between the sensor's current temperature and a calibration temperature. The compensated mass flow rate output, A, is a function of the uncompensated mass flow signal, nonlinearity error, zero and span temperature compensation, zero shifts, and variations in the output amplifier.

The compensation process for a sensor in accordance with the principles of the present invention was described in relation to the discussion of the flow chart of FIG. 2. As related to the block diagram of FIG. 3, it should be clear that the process step 201 of calibration may include the determination of "zero" response, the determination and storage of correction factors for a range of input values (e.g., for a range of mass flow or pressure inputs), and the determination of a zero value and coefficient for temperature compensation, for example. The correction step 208 may include the conversion of signals from the analog regime to the digital regime and appropriate offsetting and scaling. Additionally, a number of correction factors may be added in digital form, using a microprocessor and code, for example, in step 208 before being converted to analog form for summing in step 204. Likewise, the difference computation of step 210 may take place in digital form within a microprocessor executing code.

Figure 4:
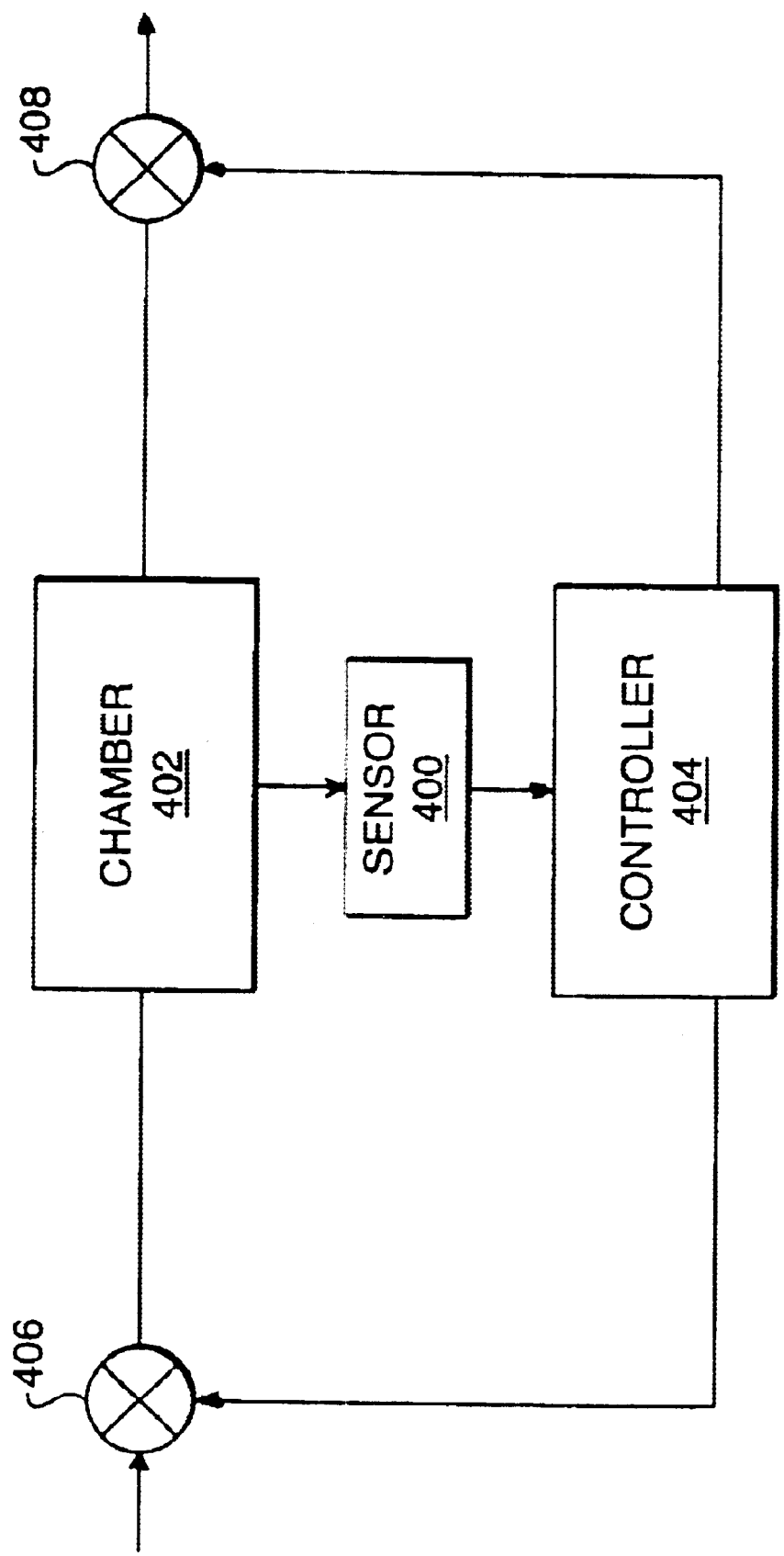
FIG. 4 is a block diagram of a system employing a compensated sensor in accordance with the principles of the present invention.

The conceptual block diagram of FIG. 4 depicts a control system in accordance with the principles of the present invention in which a compensated sensor 400, such as the sensor 100 previously described, is configured to monitor a process chamber 402. The sensor 400 provides a compensated sensor output to a controller 404. The compensated sensor 400 may be a pressure- or mass flow-sensor, for example, that is compensated for nonlinearity and/or temperature effects, as previously described. The sensor output provided to the controller 404 may be the compensated analog output, or both the compensated analog and compensated digital sensor outputs, as previously described. In this illustrative embodiment, the controller 404 may employ the sensor output to control one or more input valves 406 or one or more output valves 408. The valves 406, 408 may be used to control the flow of fluid into or out of a chamber used in conjunction with a mass flow controller. Mass flow controllers are known and described, for example, in U.S. Pat. No. 5,594,666, issued to Suzuki et al., Jan. 14, 1997, which is hereby incorporated by reference.

A software implementation of the above described embodiment(s) may comprise a series of computer instructions either fixed on a tangible medium, such as a computer readable media, e.g. diskette, CD-ROM, ROM, or fixed disc, or transmittable to a computer system, via a modem or other interface device, such as communications adapter connected to the network over a medium. Medium can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although exemplary embodiments of the invention have been disclosed, it will be apparent to those skilled in the art that various changes and modifications can be made which will achieve some of the advantages of the invention without departing from the spirit and scope of the invention. It will be understood to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results. Processes illustrated through the use of flow charts may not be strictly linear processes and alternative flows may be implemented within the scope of the invention. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A compensated sensor comprising:
   a sensor configured to produce an uncompensated output signal responsive to a physical phenomenon;
   a relatively fast feedthrough path including a summer, the feedthrough path configured to produce a relatively fast compensated output signal;
   a relatively slow compensation path including compensation circuitry that is configured to produce one or more correction factors and to supply the one or more correction factors to said summer and to produce a relatively slow compensated signal, said summer configured to sum the one or more correction factors from the compensation circuitry with the uncompensated sensor output signal; and
   a feedback path configured to supply said relatively fast compensated output signal to said compensation circuitry, said compensation circuitry being configured to compare the fast compensated output signal to the slow compensated signal and to provide the difference between the two to the summer for summing with the uncompensated sensor signal and the one or more correction factors.

2. The compensated sensor of claim 1, wherein the relatively fast feedthrough path substantially comprises analog circuitry.

3. The compensated sensor of claim 1, wherein the relatively slow compensation path substantially comprises digital circuitry.

4. The compensated sensor of claim 1 wherein the summer comprises a summing amplifier that produces a relatively fast compensated output signal.

5. The compensated sensor of claim 4 further comprising one or more analog to digital converters (ADCs) configured to convert the uncompensated sensor output from the sensor and the relatively fast compensated output signal from the summing amplifier from digital to analog form.

6. The compensated sensor of claim 5 wherein the compensation circuitry includes a microprocessor configured to employ a lookup table to produce a correction factor for sensor nonlinearity.

7. The compensated sensor of claim 6 wherein the microprocessor is further configured to employ a temperature coefficient to produce a correction factor to correct for the effect of temperature on the uncompensated sensor output.

8. The compensated sensor of claim 7 wherein the microprocessor is configured to add the one or more correction factors to the uncompensated sensor output to produce a relatively slow compensated sensor signal.

9. The compensated sensor of claim 8 wherein the microprocessor is configured to compute the difference between the relatively slow compensated sensor signal and the relatively fast compensated sensor signals.

10. The compensated sensor of claim 9 wherein the microprocessor is configured to add the one or more correction factors to the difference between the relatively slow and relatively fast compensated sensor signals and to supply the resultant to a digital to analog converter (DAC) that is configured to supply the resultant analog signal to a summing input of said summing amplifier.

11. A process controller comprising:
    a controller responsive to a compensated sensor output by controlling a process control parameter from one or more control outputs; and
    a compensated sensor configured to supply said compensates sensor output to the controller, the compensated sensor including,
       a sensor configured to produce an uncompensated output signal responsive to a physical phenomenon;
       a relatively fast feedthrough path including a summer, the feedthrough path configured to produce a relatively fast compensated output signal;
       a relatively slow compensation path including compensation circuitry that is configured to produce one or more correction factors and to supply the one or more correction factors to said summer and to produce a relatively slow compensated signal, said summer configured to sum the one or more correction factors from the compensation circuitry with the uncompensated sensor output signal; and
       a feedback path configured to supply said relatively fast compensated output signal to said compensation circuitry, said compensation circuitry being configured to compare the fast compensated output signal to the slow compensated signal and to provide the difference between the two to the summer for summing with the uncompensated sensor signal and the one or more correction factors.

12. The process controller of claim 11 wherein the process control parameter is the setting of one or more valves, each of which contributes to the control of fluid in a process chamber.

13. The process controller of claim 12, wherein the relatively fast feedthrough path substantially comprises analog circuitry.

14. The process controller of claim 12, wherein the relatively slow compensation path substantially comprises digital circuitry.

15. The process controller of claim 12 wherein the summer comprises a summing amplifier that produces a relatively fast compensated output signal.

16. The process controller of claim 15 further comprising one or more analog to digital converters (ADCs) configured to convert the uncompensated sensor output from the sensor and the relatively fast compensated output signal from the summing amplifier from digital to analog form.

17. The process controller of claim 16 wherein the compensation circuitry includes a microprocessor configured to employ a lookup table to produce a correction factor for sensor nonlinearity.

18. The process controller of claim 17 wherein the microprocessor is further configured to employ a temperature coefficient to produce a correction factor to correct for the effect of temperature on the uncompensated sensor output.

19. The process controller of claim 18 wherein the microprocessor is configured to add the one or more correction factors to the uncompensated sensor output to produce a relatively slow compensated sensor signal.

20. The process controller of claim 19 wherein the microprocessor is configured to compute the difference between the relatively slow compensated sensor signal and the relatively fast compensated sensor signals.

21. The process controller of claim 20 wherein the microprocessor is configured to add the one or more correction factors to the difference between the relatively slow and relatively fast compensated sensor signals and to supply the resultant to a digital to analog converter (DAC) that is configured to supply the resultant analog signal to a summing input of said summing amplifier.

22. A method of compensating a sensor comprising the steps of:
(A) producing in a sensor an uncompensated output signal responsive to a physical phenomenon;
(B) producing relatively fast compensated output signal in a feedthrough path that includes a summer;
(C) producing one or more correction factors in relatively slow compensation circuitry and supplying the one or more correction factors to said summer;
(D) producing a relatively slow compensated signal in said compensation circuitry;
(E) summing the one or more correction factors from the compensation circuitry with the uncompensated sensor output signal; and
(F) computing the difference between the relatively slow and relatively fast compensated signals and summing the difference with said uncompensated signal and said one or more correction factors to produce the relatively fast compensated output signal.

23. The method of claim 22 wherein the summing of step (E) comprises the step of summing the one or more correction factors with the uncompensated sensor output in a summing amplifier.

24. The method of claim 22 wherein the step of producing correction factors comprises the step of a microprocessor looking up the correction factors in a lookup table.

25. The method of claim 24 wherein the step of producing correction factors comprises the step of a microprocessor employing a temperature coefficient to produce a correction factor to correct for the effect of temperature on the uncompensated sensor output.

26. A method comprising the steps of:
(A) a controller controlling a process control parameter in response to a compensated sensor output, the compensated sensor output being produced by the steps of:
(B) producing in a sensor an uncompensated output signal responsive to a physical phenomenon;
(C) producing relatively fast compensated output signal in a feedthrough path that includes a summer;
(D) producing one or more correction factors in relatively slow compensation circuitry and supplying the one or more correction factors to said summer;
(E) producing a relatively slow compensated signal in said compensation circuitry;
(F) summing the one or more correction factors from the compensation circuitry with the uncompensated sensor output signal; and
(G) computing the difference between the relatively slow and relatively fast compensated signals and summing the difference with said uncompensated signal and said one or more correction factors to produce the relatively fast compensated output signal.

27. The method of claim 26 wherein the summing comprises the step of summing the one or more correction factors with the uncompensated sensor output in a summing amplifier.

28. The method of claim 26 wherein the step of producing correction factors comprises the step of a microprocessor looking up the correction factors in a lookup table.

29. The method of claim 26 wherein the step of producing a temperature correction factor comprises the step of a microprocessor employing a temperature coefficient to produce a correction factor to correct for the effect of temperature on the uncompensated sensor output.

* * * * *

UNITED STATES PATENT AND TRADEMARK OFFICE
CERTIFICATE OF CORRECTION

PATENT NO. : 6,687,635 B2
DATED : February 3, 2004
INVENTOR(S) : Stephen F. Horne et al.

It is certified that error appears in the above-identified patent and that said Letters Patent is hereby corrected as shown below:

Column 12,
Line 12, after "(A)", delete "a controller".

Signed and Sealed this

Sixth Day of July, 2004

JON W. DUDAS
*Acting Director of the United States Patent and Trademark Office*